US012495939B2

(12) United States Patent
Deng

(10) Patent No.: US 12,495,939 B2
(45) Date of Patent: Dec. 16, 2025

(54) TRASH BAG CLOSING MECHANISM, COMMODE CHAIR, TRASH CONTAINER AND ITS CONTROL

(71) Applicant: HUIYUANDONG (XIAMEN) HEALTH TECHNOLOGY CO., LTD., Xiamen (CN)

(72) Inventor: Yunjiang Deng, Xiamen (CN)

(73) Assignee: HUIYUANDONG (XIAMEN) HEALTH TECHNOLOGY CO., LTD., Xiamen (CN)

(*) Notice: Subject to any disclaimer, the term of this patent is extended or adjusted under 35 U.S.C. 154(b) by 308 days.

(21) Appl. No.: 18/129,084

(22) Filed: Mar. 31, 2023

(65) Prior Publication Data

US 2024/0252001 A1 Aug. 1, 2024

(30) Foreign Application Priority Data

Jan. 31, 2023 (CN) ......................... 202310084180.5

(51) Int. Cl.
*B65F 1/00* (2006.01)
*A47K 11/04* (2006.01)
*B65F 1/14* (2006.01)

(52) U.S. Cl.
CPC ............ *A47K 11/04* (2013.01); *B65F 1/1426* (2013.01)

(58) Field of Classification Search
CPC ........ B65F 1/1426; B65F 1/062; B65F 1/065; B65F 1/14; B65F 1/06; B65F 2210/167
USPC .......................................................... 53/477
See application file for complete search history.

(56) References Cited

FOREIGN PATENT DOCUMENTS

CN 210784133 U 6/2020
CN 114933102 A * 8/2022 ............. B65B 51/10

* cited by examiner

*Primary Examiner* — Jacob A Smith

(57) ABSTRACT

The present invention provides a trash bag closing mechanism, including: a transmission assembly which includes a power unit and a scissor-hinge unit; a first guide plate arranged on the scissor-hinge unit; a second guide plate arranged opposite to the first guide plate; where the power unit is used to drive the scissor-hinge unit to expand and contract, which consequently drives the first guide plate to slide toward the second guide plate to realize the closing and opening of the trash bag; and a heat sealing assembly arranged on the first guide plate and/or the second guide plate and used for heat sealing a closed trash bag. The range-extending effect of the transmission is realized through the scissor-hinge unit, reducing the energy consumption of operation and achieving the effect of energy saving.

6 Claims, 9 Drawing Sheets

TRASH BAG CLOSING MECHANISM, COMMODE CHAIR, TRASH CONTAINER AND ITS CONTROL

CROSS-REFERENCE TO RELATED APPLICATIONS

This application is based upon and claims priority to Chinese Patent Application No. 202310084180.5, filed on Jan. 31, 2023, the entire content of which is incorporated herein by reference.

TECHNICAL FIELD

The present invention relates to a trash bag closing mechanism, a commode chair, as well as a trash container and its control, which is applied in the field of toilets.

BACKGROUND

Commode chair is designed for the elderly and the disabled and allows them to go to the toilet directly beside the bed, which avoids the risk that the elderly and the disabled may fall down when they go to the washroom without anyone to care for them at night. Commode chair can also be carried for an outdoor travel to avoid the situation that one cannot go to the toilet timely due to long distance. The commode chair does not need to be flushed and is convenient and portable. With the update and development of technology, the existing commode chair can automatically package and collect excrement for heat sealing, thereby solving the problems of being unhygienic, highly infective, and difficult in bag replacement. For example, CN201921355833.4 discloses a heat sealing assembly, the transmission unit of which uses a motor gear to drive a synchronous wheel to move so that the heat sealing assembly exerts the function of heat sealing in a transmission manner. However, since the transmission unit needs to move for a long distance and a long time to achieve the closing, and the overall cost of the transmission unit is relatively high, the further application of the trash container is limited. Due to the high frequency of automatic packaging and collection of the trash container, using this transmission mode requires relatively high energy consumption. Replacing this unit with a mechanism with the range-extending effect can achieve energy-saving effect, thereby reducing energy consumption and cost. In view of the foregoing problems, the present application designs a trash bag closing mechanism.

SUMMARY

The present invention provides a trash bag closing mechanism, a commode chair and control method thereof, which can effectively solve the above problems.

The present invention is implemented as follows:

A trash bag closing mechanism used in a commode chair includes:

- a transmission assembly which includes a power unit and a scissor-hinge unit;
- a closing assembly which includes a first guide plate arranged on the scissor-hinge unit and a second guide plate arranged opposite to the first guide plate; and
- a heat sealing assembly which is arranged on the first guide plate and/or the second guide plate and used for heat sealing a closed trash bag.

The power unit is used to drive the scissor-hinge unit to expand and contract, which consequently drives the first guide plate to slide toward the second guide plate to realize the closing and opening of the trash bag.

A package-type commode chair includes:

- a commode chair body which includes a trash bag receiving port at the top and a discharge plate away from the trash bag receiving port;
- a trash bag fixing unit which is arranged at the trash bag receiving port for storing hollow trash bags;
- a bag feeding unit which is arranged below the trash bag fixing unit; and a trash bag closing mechanism which is arranged under the bag feeding unit.

A control method for a package-type commode chair includes the following steps:

- S10: fixing the trash bag on the trash bag fixing unit;
- S20: pulling the trash bag out of the trash bag fixing unit through the bag feeding unit;
- S30: sending the bag at a predetermined distance through the bag feeding unit;
- S40: after use, closing and heat sealing through the trash bag closing mechanism.

A trash container includes:

- a trash container body which includes a trash bag receiving port and a discharge port;
- a trash bag fixing unit which is arranged at the trash bag receiving port for storing hollow trash bags;
- a bag feeding unit which is arranged below the trash bag fixing unit; and
- a trash bag closing mechanism which is arranged under the bag feeding unit.

The present invention has the following advantages:

The present application includes a transmission assembly including a power unit and a scissor-hinge unit; a first guide plate arranged on the scissor-hinge unit; a second guide plate arranged opposite to the first guide plate; the power unit is used to drive the scissor-hinge unit to expand and contract, which consequently drives the first guide plate to slide toward the second guide plate to realize the closing and opening of the trash bag; a heat sealing assembly arranged on the first guide plate and/or the second guide plate and used for heat sealing a closed trash bag. The range-extending effect of the transmission is realized through the scissor-hinge unit, reducing the energy consumption of operation and achieving the effect of energy saving.

BRIEF DESCRIPTION OF THE DRAWINGS

In order to illustrate the technical solutions of the embodiments of the present invention more clearly, the accompanying drawings used in the embodiments will be briefly introduced below. It should be understood that the following drawings only show some embodiments of the present invention, and therefore should not be regarded as a limitation on the scope. Those skilled in the art can also obtain other related drawings based on these drawings without creative work.

DETAILED DESCRIPTION OF THE EMBODIMENTS

In order to make the purposes, technical solutions, and advantages of the embodiments of the present invention clearer, the technical solutions in the embodiments of the present invention will be clearly and completely described below in conjunction with the accompanying drawings in the embodiments of the present invention. Obviously, the embodiments described herein are some embodiments of the present invention, rather than all embodiments. Based on the embodiments of the present invention, all other embodiments obtained by those of ordinary skill in the art without creative efforts fall within the protection scope of the present invention. Accordingly, the following detailed description of the embodiments of the present invention provided in the accompanying drawings is not intended to limit the scope of the present invention, but merely represents selected embodiments of the present invention.

Embodiment 1

Figure 1:
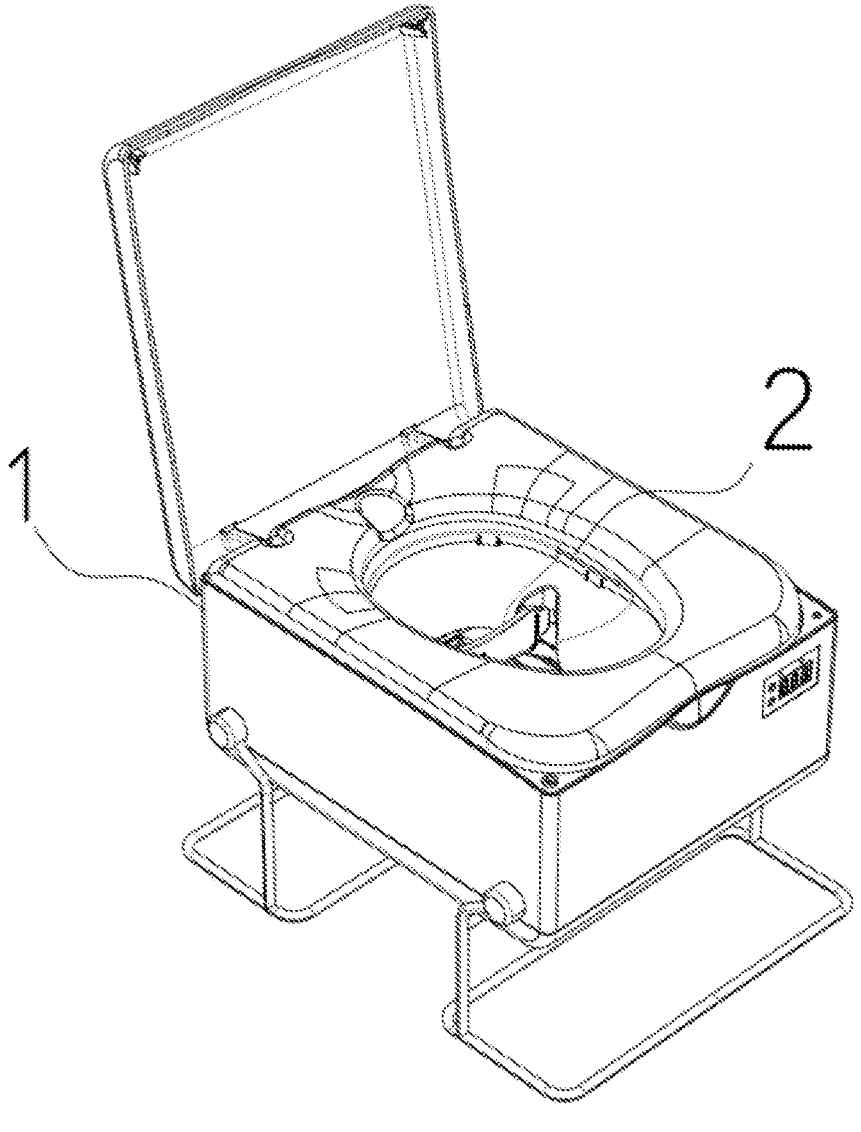
FIG. 1 is a schematic diagram of the overall structure provided in Embodiment 1 of the present invention.
Figure 2:
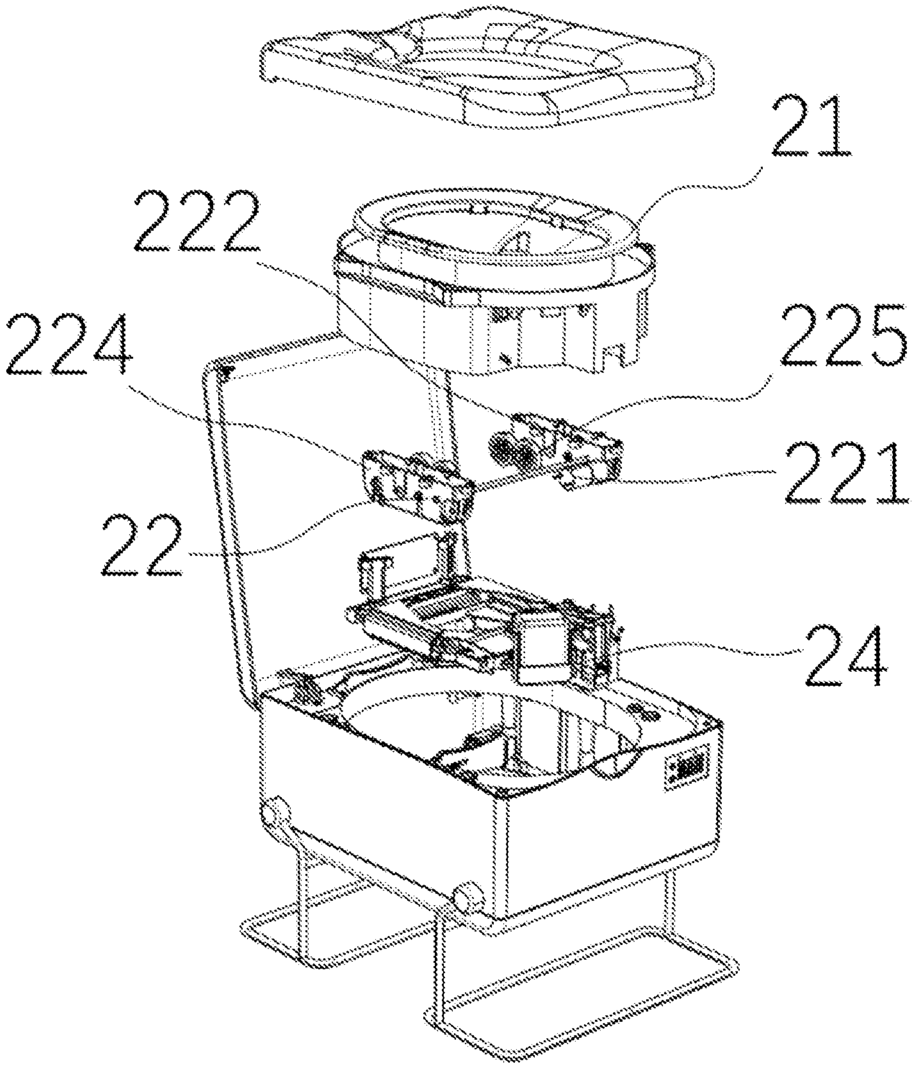
FIG. 2 is an exploded view of the structure provided in Embodiment 1 of the present invention.

Referring to FIG. 1 to FIG. 2, a commode chair capable of closing a trash bag includes: a commode chair body 1 which includes a trash bag receiving port, a discharge port and a collection device 2 which is arranged on the lower part of the commode chair body 1. The collection device 2 includes: a trash bag fixing unit 21 which is used to provide a hollow trash bag 3; a bag feeding unit 22 which is arranged at the bottom of the trash bag fixing unit 21 and used to clamp two sides of the trash bag 3 and deliver the trash bag 3 downwards; and a trash bag closing mechanism which includes a transmission assembly 23, a closing assembly 24, and a heat sealing assembly 25. The transmission assembly 23 includes a power unit 231 and a scissor-hinge unit 232. The closing assembly 24 includes a first guide plate 241 arranged on the scissor-hinge unit 232 and a second guide plate 242 arranged opposite to the first guide plate 241. The heat sealing assembly 25 is arranged at the bottom of the closing assembly 24 and used to seal the trash bag 3. The commode chair can realize functions such as automatic bag feeding, automatic collection, automatic packaging, and heat sealing of excrement. In addition, the commode chair capable of closing the trash bag is portable and suitable for use outdoors or by children and middle-aged and elderly people.

Figure 3:
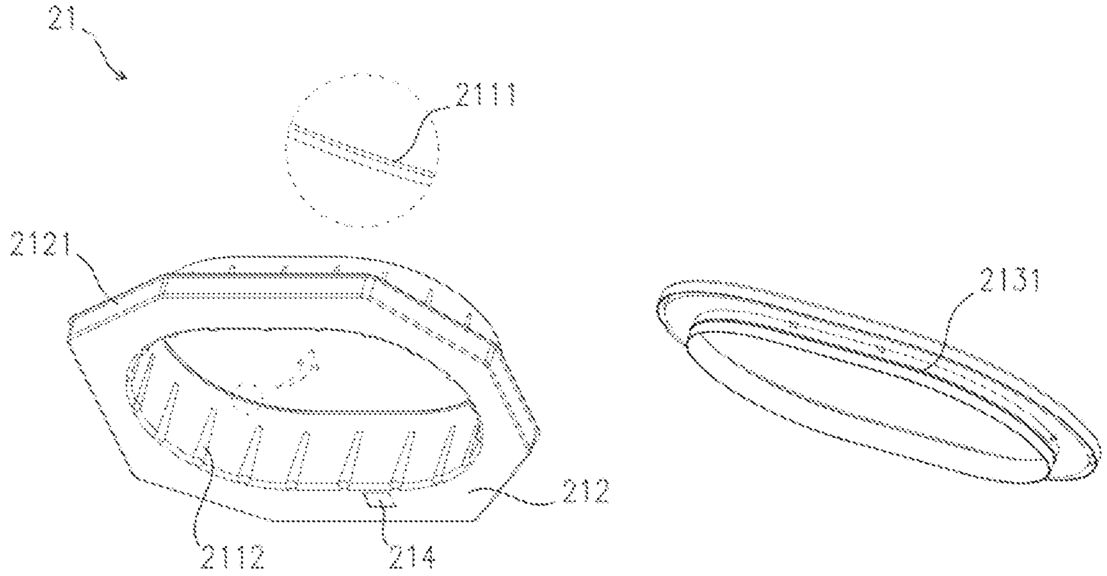
FIG. 3 is a schematic structural diagram of the trash bag fixing unit provided in Embodiment 1 of the present invention.
Figure 4:
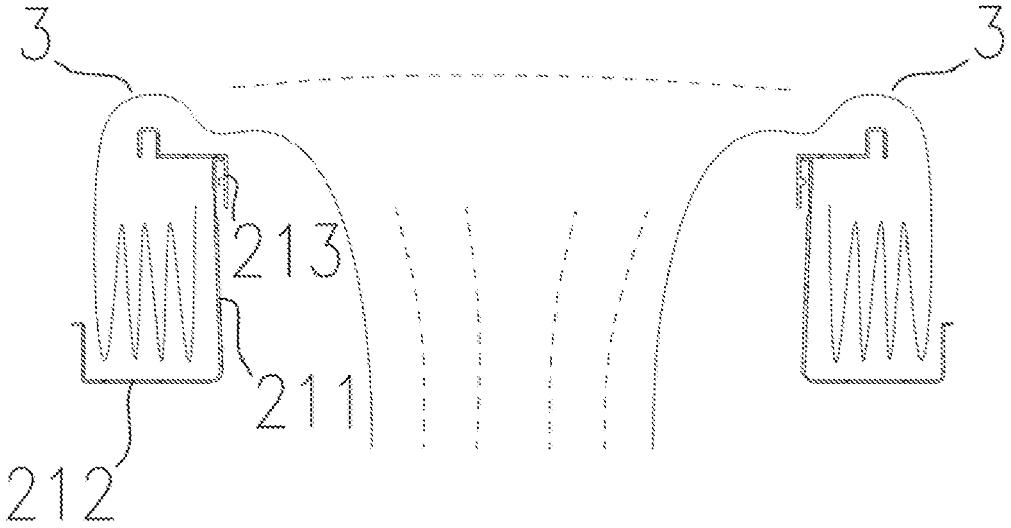
FIG. 4 is a schematic diagram showing the installation position of the trash bag provided in Embodiment 1 of the present invention.

As shown in FIG. 3 to FIG. 4, the trash bag fixing unit 21 includes: a hollow column 211 which is used to support the hollow trash bag 3; a chassis 212 which extends outward from the bottom of the hollow column 211 horizontally and is fixed on the commode chair body 1; and a ring-shaped cover 213 covering the top of the hollow column 211. One end of the trash bag 3 passes around the ring-shaped cover 213 from the outer side of the hollow column 211 and enters the inner side of the hollow column 211. The chassis 212 further includes a surrounding side 2121 arranged upward along the edge of the chassis 212 vertically, so that the trash bag 3 will not move outward during use. The present device can support bag in another way without using the trash bag fixing unit 21.

A folded soft bag is set in an annular groove of the base of the mechanism, and the ring-shaped cover 213 covers on the annular groove. Preferably, the height of the surrounding side 2121 is 15 mm-25 mm. In the present embodiment, the height of the surrounding side 2121 is 22 mm. The other end of the hollow column 211 extends inwardly to form an engaging ring 2111; the ring-shaped cover 213 further includes an engaging portion 2131 matched with the engaging ring 2111. Ribs 2112 are uniformly and vertically arranged on the side wall of the hollow column 211. The trash bag fixing unit 21 further includes a sensor 214 arranged on the surface of the chassis 212 close to the ring-shaped cover 213 for detecting the supply status of the trash bag 3. Preferably, the thickness of the material for the trash bag 3 is 0.005 mm-0.2 mm; more preferably, the thickness of the material for the trash bag 3 is 0.01 mm-0.03 mm. In the present embodiment, the thickness of the material for the trash bag 3 is 0.01 mm.

Figure 5:
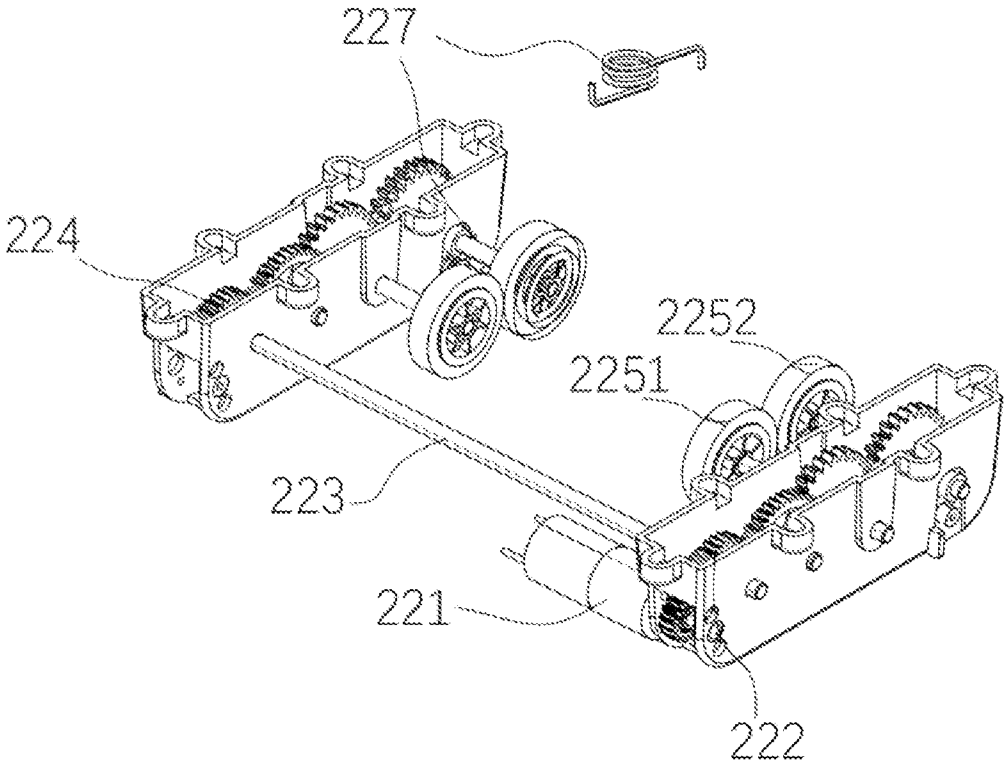
FIG. 5 is a schematic structural diagram of the bag feeding unit provided in Embodiment 1 of the present invention.
Figure 6:
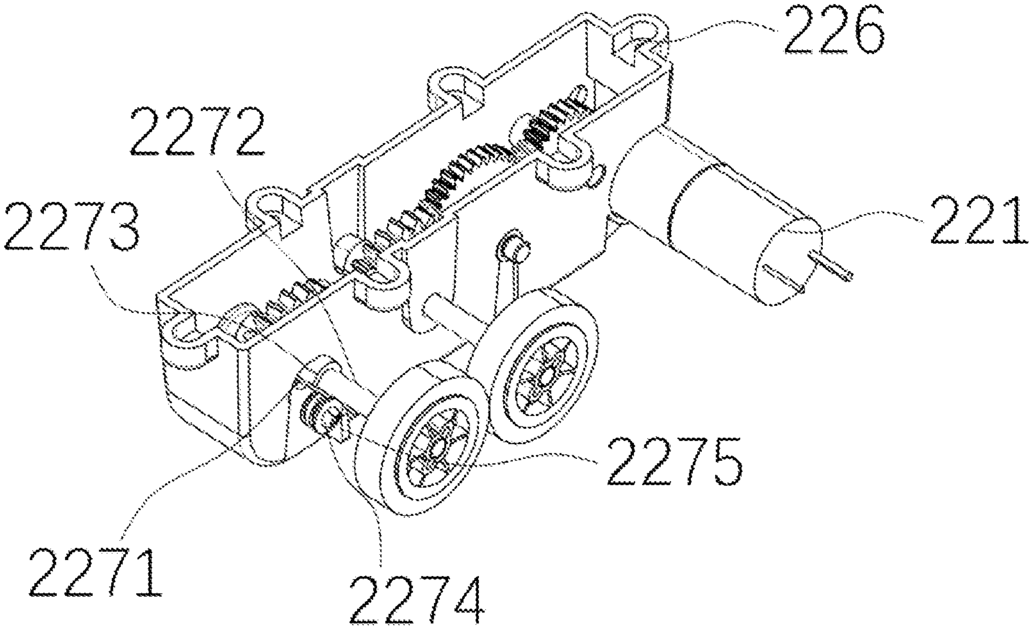
FIG. 6 is a partial structural diagram of the bag feeding unit provided in Embodiment 1 of the present invention.
Figure 7:
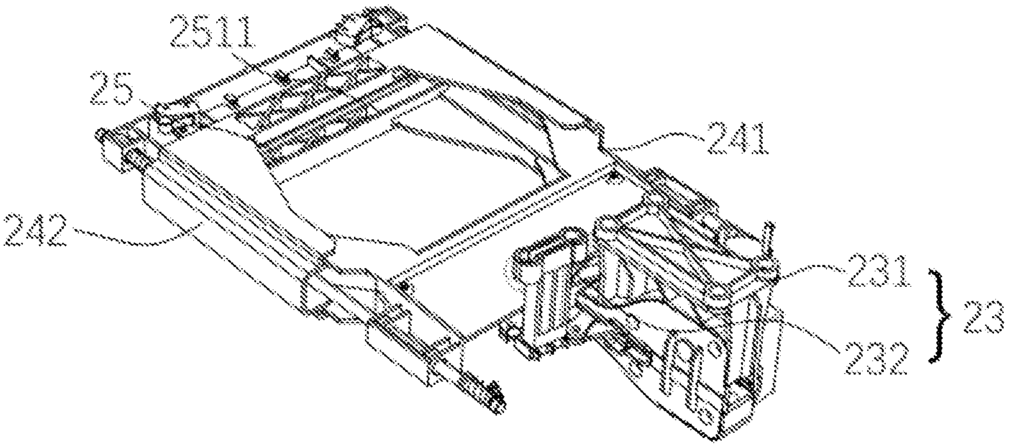
FIGS. 7-8 are schematic structural diagrams of the trash bag closing mechanism provided in Embodiment 1 of the present invention.
Figure 8:
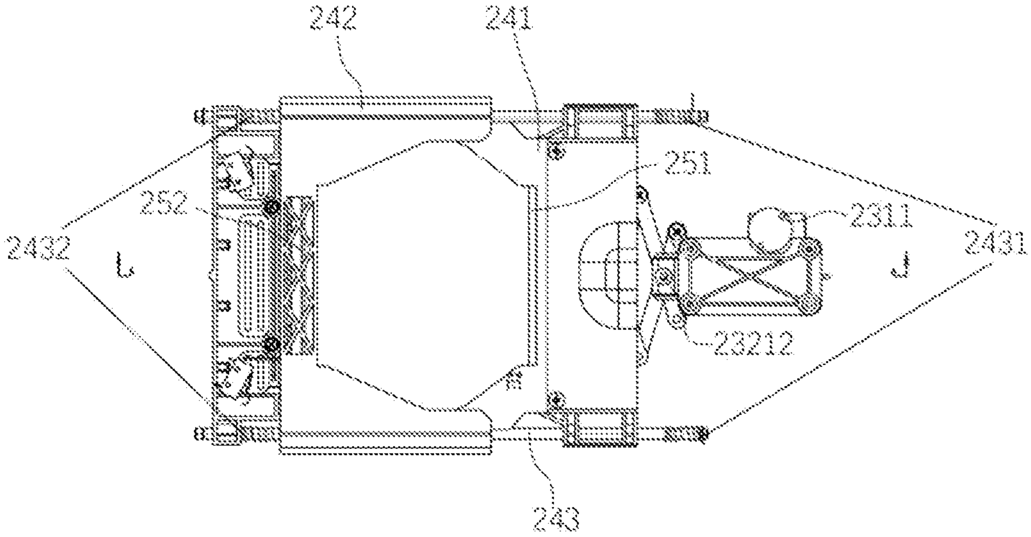
Figure 9:
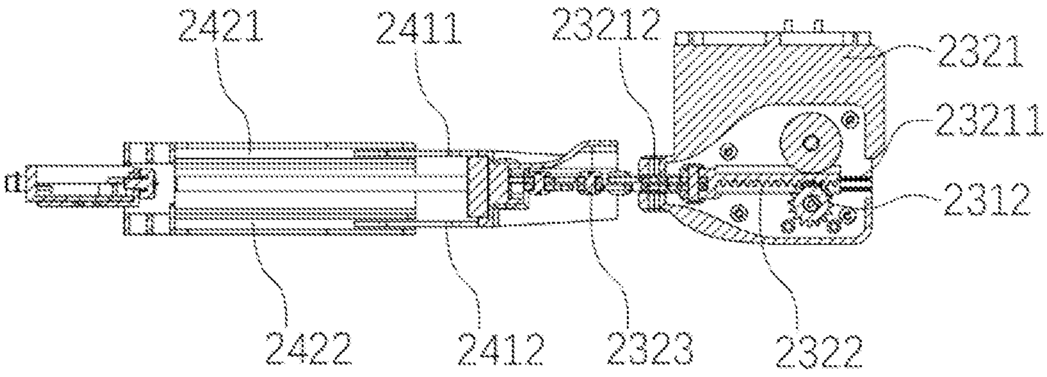
FIG. 9 is a cross-sectional view along line A-A of FIG. 8.
Figure 10:
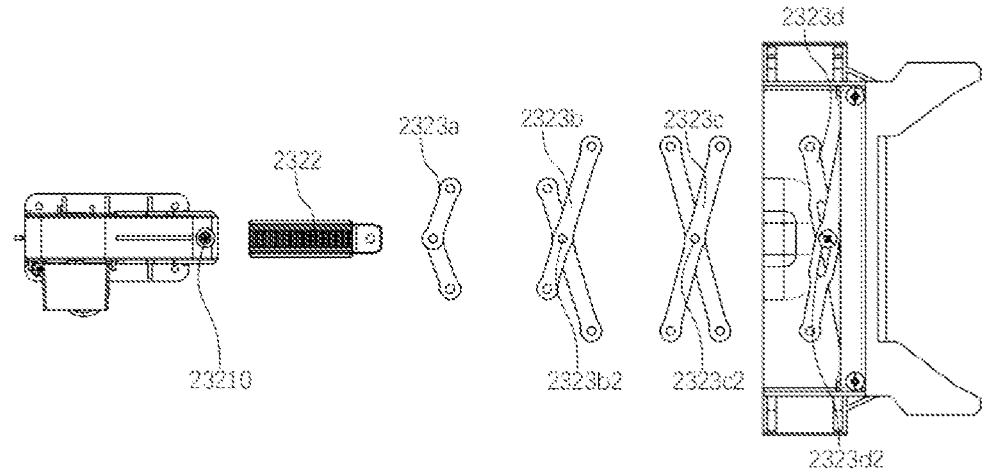
FIG. 10 is an exploded view of the transmission assembly provided in Embodiment 1 of the present invention.
Figure 11:
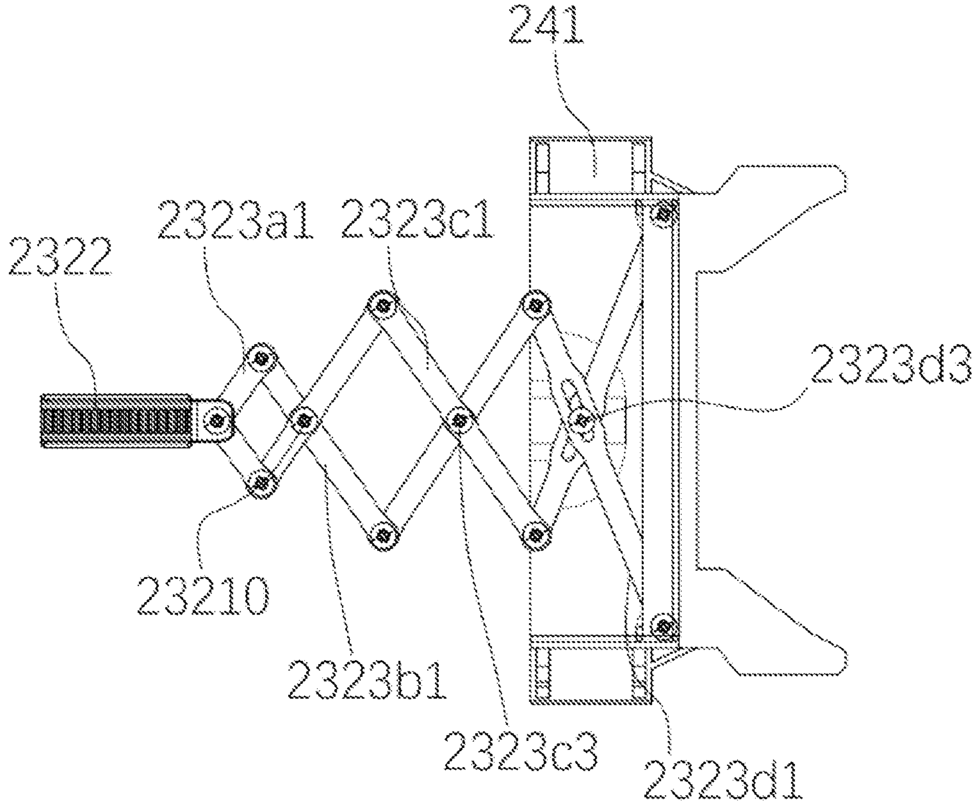
FIG. 11 is a schematic structural diagram of the transmission assembly provided in Embodiment 1 of the present invention.
Figure 12:
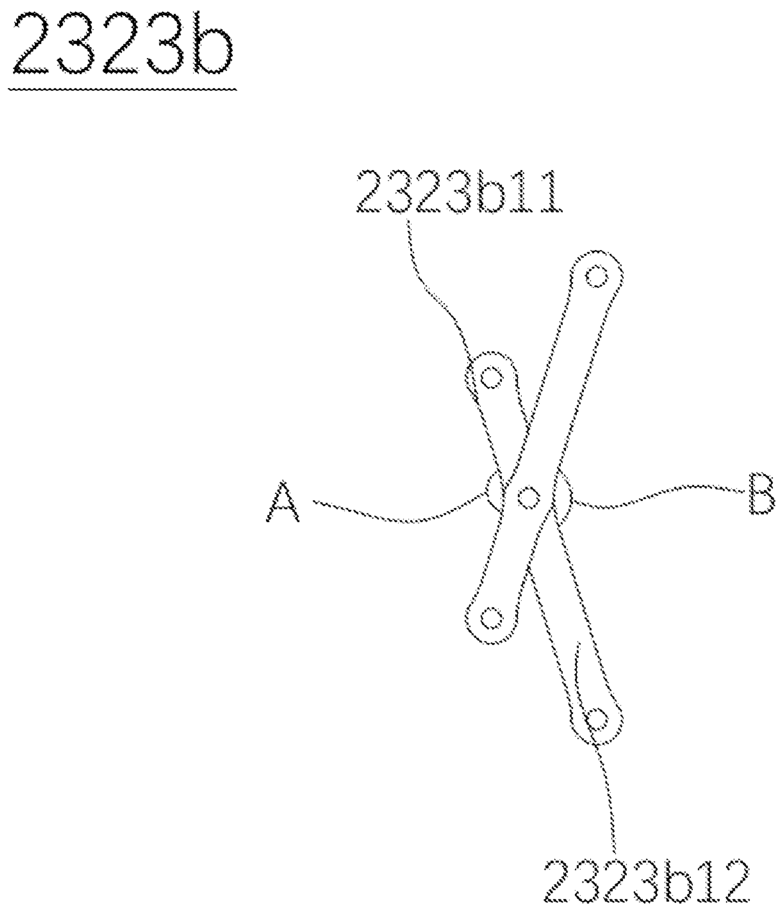
FIG. 12 is a schematic structural diagram of the second scissor set provided in Embodiment 1 of the present invention.
Figure 13:
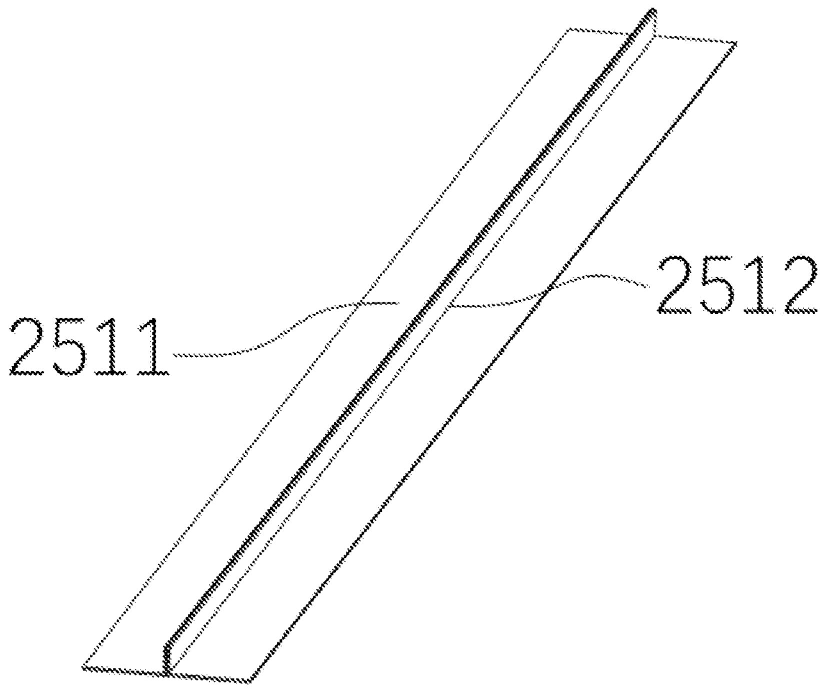
FIG. 13 is a schematic structural diagram of the heat-sealing knife provided in Embodiment 1 of the present invention.

Referring to FIG. 5 to FIG. 6, the bag feeding unit 22 includes: a first motor 221; a first gear set 222 connected to the first motor 221; a transmission shaft 223 arranged on the first gear set 222; a second gear set 224 connected to the transmission shaft 223 and symmetrical to the first gear set 222, each gear set including a driving gear and a driven gear that cooperates with the driving gear; and a bag feeding wheel set 225 symmetrically arranged on the first gear set 222 and the second gear set 224, each bag feeding wheel set 225 including a first driving wheel 2251 arranged on the driving gear and a first driven wheel 2252 arranged on the driven gear, and the first driving wheel 2251 and the first driven wheel 2252 in each bag feeding wheel set 225 being tangent. The first driving wheel 2251 and the first driven wheel 2252 are arranged on the same plane. The bag feeding unit 22 further includes a gear installation housing 226 receiving the first gear set 222 and the second gear set 224, respectively. The torsion spring assembly 227 includes a straight notch 2271 arranged at the end of the gear installation housing away from the driving gear, the first driven wheel 2252 passes through the straight notch 2271 via a rotating shaft 2272 to connect to the driven gear, and the rotating shaft 2272 is sleeved with an arc-shaped stopper 2273. A torsion spring 2274 is arranged below the rotating shaft 2272, and the torsion spring 2274 abuts against the arc-shaped stopper 2273 to achieve a small displacement of the first driven wheel 2252 to fix the trash bag 3. The gear installation housing 226 also includes a torsion spring stopper 2275 arranged below the straight notch 2271. One end of the torsion spring 2274 abuts against the torsion spring stopper 2275, and the other end abuts against the arc-shaped stopper 2273. In the process of setting bag, since a bag setting correction device is needed to tightly clamp one end of the trash bag 3 in the bag feeding wheel set 225, the design of the bag feeding unit 22 enables the driven gear to realize a small downward displacement, so that a gap is formed between the first driving wheel 2251 and the first driven wheel 2252 to allow the entry of the bag setting correction device therein. That is, the trash bag 3 is placed in the bag feeding wheel set 225, the bag setting correction device is then removed, the torsion spring 229 drives the first driven wheel 2252 to reset, and the bag feeding wheel set 225 clamps the trash bag 3 tightly.

The replacement of the trash bag 3 of the present invention is as follows. After the trash bag 3 is used, the ring-shaped cover 213 is removed from the hollow column 211, a new trash bag 3 is taken and set on the hollow column 211, and then the ring-shaped cover 213 covers on the hollow column 211. One end of the trash bag 3 is pulled up from the outer side of the hollow column 211 to pass around the ring-shaped cover 213 and enter the inner side of the hollow column 211. The bag setting correction device is used to place one end of the trash bag 3 together in the bag feeding wheel set 225 and then removed for normal use. When a soft bag is used, the ring-shaped cover 213 is removed from the base of the mechanism, the soft bag is set in the annular groove of the mechanism, and then the ring-shaped cover 213 covers. The soft bag is pulled up to pass around the ring-shaped cover and placed in the bag feeding wheel set 225 for fixation.

Referring to FIG. 7 to FIG. 12, a trash bag closing mechanism include:

- the transmission assembly 23 which includes the power unit 231 and the scissor-hinge unit 232;
- the closing assembly 24 which includes the first guide plate 241 arranged on the scissor-hinge unit 232 and the second guide plate 242 arranged opposite to the first guide plate 241; and
- the heat sealing assembly 25 which is arranged on the first guide plate 241 and/or the second guide plate 242 and used for heat sealing the closed trash bag 3.

The power unit 231 is used to drive the scissor-hinge unit 232 to expand and contract, which consequently drives the first guide plate 241 to slide toward the second guide plate 242 to realize the closing and opening of the trash bag 3.

The power unit 231 includes a second motor 2311 and a reducer (not labeled in the figure) connected to the second motor 2311. In the present embodiment, the second motor 2311 is preferably a direct current (DC) motor, which is for the purpose of reducing the cost. The second motor 2311 is connected to the first gear 2312. The scissor-hinge unit includes a fixing member 2321, and the fixing member 2321 is provided with a guide groove 23211. A first rack 2322 can be slidably connected to the guide groove 23211, the first gear 2312 meshes with the first rack 2322, and the first rack 2322 is connected to a scissor hinge 2323. The end of the fixing member 2321 away from the first gear 2312 is provided with a smooth wheel 2324. The smooth wheel 2324 abuts against the first rack 2322 to make the first rack 2322 run more stably and prevent the first rack 2322 from jumping vertically under force, which avoids unsmooth movement or decelerates the wear of the first rack 2322. In other embodiments, the first rack is further fixed by using a gear. At this time, meshing teeth are arranged on both sides of the first rack 2322 and the stability of the first rack 2322 is increased by using a two-way gear fixing mode. The scissor hinge 2323 includes: 2 to 6 scissor sets, and the length of each scissor set increases along the direction away from the first rack 2322. Preferably, the scissor hinge 2323 includes: 3-5 scissor sets. This is because on the one hand, if the number is too small, the range extending is not obvious, and the bag cannot be effectively closed; on the other hand, if the number is too large, the mechanism is prone to being unstable. In one of the embodiments, the scissor hinge 2323 includes: 4 scissor sets. Specifically, the scissor hinge 2323 includes: a first scissor set **2323*a* which includes two first scissor arms 2323*a*1. One end of the first scissor arm 2323*a*1 is rotatably arranged on the first rack 2322**;

- a second scissor set **2323*b* includes two second scissor arms 2323*b*1 intersected, and the second scissor arms 2323*b*1 are each provided with a second through hole 2323*b*2 at the intersection. One end of each second scissor arm 2323*b*1 is rotatably connected to the other end of each first scissor arm 2323*a*1, respectively. The fixing member 2321 further includes a first bolt 23210 passing through the second through hole 2323*b*2, so that the second scissor arms 2323*b*1 can swing around the first bolt 23210 to extend the range. The second through hole 2323*b*2 is provided at the end of the second scissor arm 2323*b*1 close to the first scissor set 2323*a*, and the second scissor arm 2323*b*1 is divided into a second front scissor arm 2323*b*11 and a second rear scissor arm 2323*b*12, that is, the length of the second front scissor arm 2323*b*11 is less than that of the second rear scissor arm 2323*b*12. At this time, the first rack 2322 is moved to make the angle A between the second front scissor arms 2323*b*11 and the angle B between the second rear scissor arms 2323*b*12 equal. Since the length of the second front scissor arm 2323*b*11 is less than that of the second rear scissor arm 2323*b*12, according to the triangle theorem, the horizontal movement distance of the second rear scissor arm 2323*b*12 is greater than that of the second front scissor arm 2323*b*11 to realize the range-extending effect. When the first bolt 23210 fixes the second through hole 2323*b*2, the stability of the scissor hinge 2323 is significantly improved. A third scissor set 2323*c* includes two third scissor arms 2323*c*1 intersected and a second bolt 2323*c*3, and the third scissor arms 2323*c*1 are each provided with a third through hole 2323*c*2 at the intersection. One end of each third scissor arm 2323*c*1 is rotatably connected to the other end of each second scissor arm 2323*b*1, respectively, and the second bolt 2323*c*3 passes through the third through hole 2323*c*2. The third scissor arm exerts the function of conduction, and multiple third scissor sets 2323*c* can be set. In the present embodiment, one third scissor set 2323*c*** is set.

A fourth scissor set **2323*d* includes two fourth scissor arms 2323*d*1 intersected and a third bolt 2323*d*3, and the fourth scissor arms 2323*cd*1 are each provided with a fourth elongated through hole 2323*d*2 at the intersection. One end of each fourth scissor arm 2323*d*1 is rotatably connected to the other end of each third scissor arm 2323*c*1, respectively, and the third bolt 2323*d*3 passes through the fourth elongated through hole 2323*d*2. According to the principle of scissor hinge, in order to achieve the rotational connection between the end of the fourth scissor arm 2323*d*1 away from the third scissor set 2323*c* and the first guide plate 241 and increase the movement stability of the scissor hinge 2323, the fourth elongated through hole 2323*d*2 is set to realize the angle change between the fourth scissor arms 2323*d*1 to allow the movement of the scissor hinge 2323. The fourth scissor arm 2323*d*1 also has a limit function to limit the movement of the scissor hinge 2323 within the length range of the fourth elongated through hole 2323*d*2. The stability of the scissor hinge 2323 ensures the stability of reciprocating movement. In the present invention, the length of each scissor set of the scissor hinge 2323 increases along the direction away from the first rack 2322, which reflects the range-extending effect of the transmission assembly 23, reduces the rotation of the second motor 2311** in each closing process, and achieves the effect of energy saving.

As shown in FIG. 7 to FIG. 10, the closing assembly 24 includes the first guide plate 241 arranged on the scissor-hinge unit 232 and the second guide plate 242 arranged opposite to the first guide plate 241. The first guide plate 241 slides toward the second guide plate 242 to close the trash bag. Both the first guide plate 241 and the second guide plate 242 have a double-layer structure. The first guide plate 241 includes an upper clamping sheet 2411 and a lower clamping sheet 2412. The second guide plate 242 is provided with an upper clamping sheet guide groove 2421 and a lower clamping sheet guide groove 2422 which are respectively adapted to the upper clamping sheet 2411 and the lower clamping sheet 2412. The upper clamping sheet 2411 is slidably connected to the upper clamping sheet guide groove 2421 to realize the closing of the upper part of the trash bag, and the lower clamping sheet 2412 can be slidably connected to the lower clamping sheet guide groove 2422 to realize the closing of the lower part of the trash bag, so as to more accurately seal the trash bag 3. The sealing stability of the trash bag is improved by the guiding function of the first guide plate 241 and the second guide plate 242. A guide shaft 243 is provided in a positioning hole, a first spring set 2431 is arranged at the end of the guide shaft 243 close to the first guide plate 241, and a second spring set 2432 is arranged at the end of the guide shaft 243 close to the second guide plate 242. In the initial state, the scissor-hinge unit 232 and the power unit 231 are in a stress state, the first guide plate 241 compresses the first spring set 2431. When the power unit 231 drives the scissor-hinge unit 232 to extend out, the first guide plate 241, under the elastic force of the first spring set 2431, tightly pushes the second guide plate 242 to eliminate the movement caused by the gap between the scissor-hinge unit 232, so that the scissor-hinge unit 232 remains in a stable state during operation. If the gap is not eliminated by the first spring set 2431, the scissor-hinge unit 232 will not move unless the gap between the scissor-hinge unit 232 is eliminated by movement when the power unit 231 starts. In other words, the movement of the scissor-hinge unit 232 will lag behind, resulting in unsmooth movement of the scissor-hinge unit 232 and affecting the transmission of the equipment. When the first guide plate 241 contacts the second guide plate 242, the second guide plate 242 compresses the second spring set 2432 to resist the force of the heat sealing assembly. After the heat sealing is completed, the power unit 231 drives the scissor-hinge unit 242 to retract, and the second spring set 2432 tightly pushes the second guide plate 242 to assist in discharge.

Referring to FIG. 7 to FIG. 13, in one of the embodiments, the heat sealing assembly 25 includes: a first heat-sealing knife 251 and a second heat-sealing knife 252 opposite to the first heat-sealing knife 251. The second heat-sealing knife is configured to move, driven by the transmission assembly 23, toward the first heat-sealing knife 251 to achieve the heat sealing of a closed trash bag. Each heat-sealing knife includes a heat-sealing knife base 2511 and a heat-sealing blade 2512 vertically connected to the heat-sealing knife base 2511. The first heat-sealing knife base 2511 is arranged between the upper clamping sheet guide groove 2411 and the lower clamping sheet guide groove 2412 of the first guide plate 241. The second heat-sealing knife base is fixed between the upper clamping sheet 2421 and the lower clamping sheet 2422 of the second guide plate 242. The heat sealing device further includes a heating wire (not shown in the figure), and the heating wire is arranged on the inner side of the heat-sealing knife base 2511.

The advantages of using the present invention are as follows: The use of soft bag or the trash bag fixing unit 21 realizes the convenient use and quick replacement of the trash bag 3. The symmetrically arranged bag feeding unit 22 realizes synchronous bag feeding on both sides, ensuring the consistency of the movement of the trash bag 3. The closing assembly 24 allows the closing of the trash bag after a single use of the commode chair. The heat sealing assembly 25 achieves the heat sealing of the trash bag 3 being closed, completes the heating sealing and packaging of the trash bag 3, and prevents the excrement from overflowing. Further, in the present invention, the range-extending effect of the transmission assembly 23 is achieved because the length of each scissor set of the scissor hinge 2323 increases along the direction away from the first rack 2322, which reduces the rotation of the second motor 2311 during each sealing process and realizes the effect of energy saving. Moreover, this transmission mode of the present invention can also greatly reduce the overall cost compared to the existing mode. Further, the sealing stability of the trash bag is increased through the guiding functions of the first guide plate 241, the second guide plate 242, and the guide shaft 243, and the first guide plate 241 is tightly pushed by the first spring set 2431 to eliminate the movement caused by the gap between the scissor-hinge unit 232, so that the scissor-hinge unit 232 remains in a stable state during operation. The second spring set 2432 is used to resist the force of the heat sealing assembly 25 to prevent the excessive large force of the heat sealing assembly 25 from melting the opening of the trash bag, which avoids breakage and odor escaping from the trash bag 3. After the heat sealing is completed, the power unit 231 drives the scissor-hinge unit 232 to retract, and the second spring set 2432 tightly pushes the second guide plate 242 to prevent the heat-sealed trash bag 3 from adhering to the second guide plate to assist in discharge.

The present invention also includes a control method for a commode chair capable of closing a trash bag, including the following steps:

S10: fixing the trash bag on the trash bag fixing unit; the steps include: taking and setting a new trash bag 3 on the hollow column 211, then covering the ring-shaped cover 213 on the hollow column 211, pulling up one end of the trash bag 3 to pass the trash bag 3 around the ring-shaped cover 213 from the outer side of the hollow column 211 and enter the inner side of the hollow column 211, placing one end of the trash bag 3 together in the bag feeding wheel set 225 using the bag setting correction device, and removing the bag setting correction device. If a soft bag is used, the steps include: removing the ring-shaped cover 213 from the base of the mechanism, setting the soft bag into the annular groove of the mechanism, covering the ring-shaped cover 213, and pulling up the soft bag to pass around the ring-shaped cover and enter the bag feeding wheel set 225 for fixation.

S20: pulling the trash bag out of the trash bag fixing unit through the bag feeding unit 22: starting the bag feeding device 22 once detecting the human body leaving the commode chair via a sensing unit, tightly clamping the trash bag 3 or the soft bag by the bag feeding wheel set 225 on both sides, and driving the first gear set 222 and the second gear set 224 by the first motor 221 to synchronously pull the trash bag downwards and separate from the hollow column 211.

S30: sending the bag at a predetermined distance through the bag feeding unit 22, such that the opening of the trash bag falls within the operation range of the closing assembly 24 of the trash bag closing mechanism.

S40: after use, closing and heat sealing by the trash bag closing mechanism; where, the second motor 2311 drives the scissor hinge 2323, which consequently drives the first guide plate 241 to slide toward the second guide plate 242 to realize the closing and opening of the trash bag 3, and the heat sealing assembly 25 achieves the heat sealing of the trash bag 3 being closed to complete the heat sealing and packaging of the trash bag 3 and prevent the excrement from overflowing.

S50: sending the bag at a predetermined distance through the bag feeding unit again; moving the packaged trash bag 3 to a discharge plate 26 at the bottom of the commode chair body 1 to complete discharge.

Embodiment 2

Figure 14:
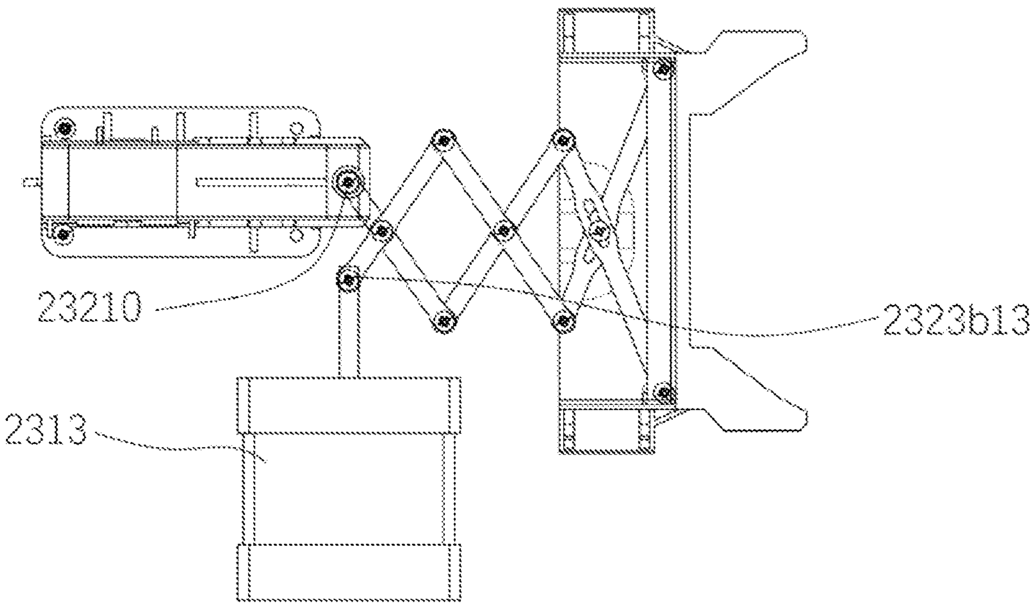
FIG. 14 is a schematic structural diagram of the transmission assembly provided in Embodiment 2 of the present invention.

Referring to FIG. 14, the present embodiment is basically the same as Embodiment 1 except that the power unit 231 includes a first cylinder 2313 connected to the second scissor set **2323*b*; the second scissor arm 2323*b*1 further includes a fifth through hole 2323*b*13 arranged at the end of the second front scissor arm 2323*b*11 away from the second through hole 23232, where the fifth through hole 2323*b*13 of one second scissor arm 2323*b*1 is connected to the first cylinder 2313, and the first bolt 23210 passes through the fifth through hole 2323*b*13 of the other second scissor arm 2323*b*1 to improve the stability of the scissor hinge 2323. In the present embodiment, the structure of the transmission assembly 23 is simplified, and the scissor hinge 2323 is driven due to the stability of the first cylinder 2313, which avoids problems such as unstable transmission and poor sealing effect caused by the large matching tolerance of the first rack 2322**.

Embodiment 3

Figure 15:
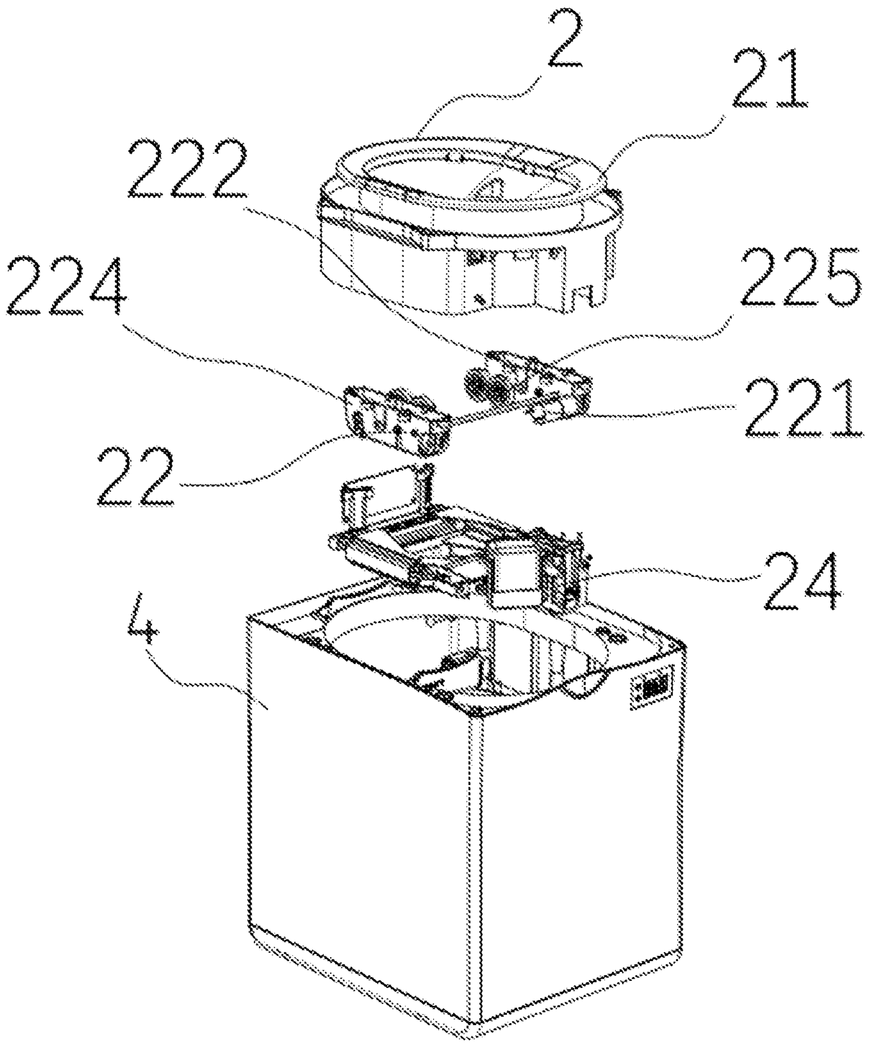
FIG. 15 is a schematic diagram of the overall structure of the trash container provided in Embodiment 3 of the present invention.

Referring to FIG. 15, Embodiment 3 of the present invention further provides a trash container, including:

a trash container body 4 which includes a trash bag receiving port and a discharge port;

a trash bag fixing unit 21 which is arranged at the trash bag receiving port for storing hollow trash bags;

a bag feeding unit 22 which is arranged below the trash bag fixing unit; and a trash bag closing mechanism which is arranged under the bag feeding unit.

The shape and structure of the trash container body 4 are not limited and can be selected according to actual needs. For example, it may be a cuboid, a cube, or the like. In one of the embodiments, the trash container body 4 is a cuboid, and the trash bag receiving port is set at the top of the cuboid, and the discharge port is set on the side wall of the cuboid (not shown in the figure).

A control method for a trash container includes the following steps:

S10: fixing the trash bag 3 on the trash bag fixing unit 21;

S20: when throwing trash, opening the trash bag through a range-extending trash bag closing mechanism;

S30: after the trash is thrown, closing through the range-extending trash bag closing mechanism again;

S40: when the trash bag 3 is full, pulling the trash bag 3 out of the trash bag fixing unit 21 through the bag feeding unit 22;

S50: sending the bag at a predetermined distance through the bag feeding unit 22.

Further, the trash bag closing mechanism further includes a heat sealing assembly which is arranged on the first guide plate 241 and/or the second guide plate 242, and the control method further includes:

S60: heat sealing through the range-extending trash bag closing mechanism.

The above descriptions are only preferred embodiments of the present invention, and are not intended to limit the present invention. For those skilled in the art, the present invention may have various modifications and changes. Any modifications, equivalent replacements, improvements, etc. made within the spirit and principles of the present invention shall be included within the protection scope of the present invention.

What is claimed is:

1. A trash bag closing mechanism, comprising:

a transmission assembly comprising a power unit and a scissor-hinge unit;

a closing assembly comprising a first guide plate arranged on the scissor-hinge unit and a second guide plate arranged opposite to the first guide plate; and a heat sealing assembly arranged on the first guide plate and/or the second guide plate and used for heat sealing a closed trash bag;

wherein the power unit is used to drive the scissor-hinge unit to expand and contract, which consequently drives the first guide plate to slide toward the second guide plate to realize the closing and opening of the trash bag;

wherein the power unit comprises a second motor and a first gear connected to the second motor; the scissor-hinge unit comprises a fixing member, a guide groove arranged on the fixing member, a first rack received in the guide groove and meshed with the first gear, and a scissor hinge connected to the first rack.

2. The trash bag closing mechanism according to claim 1, wherein the scissor hinge comprises: 2 to 6 scissor sets, and the length of each scissor set increases along the direction away from the first rack.

3. The trash bag closing mechanism according to claim 2, wherein the scissor hinge comprises:

a first scissor set, wherein the first scissor set comprises two first scissor arms, and one end of the first scissor arm is rotatably arranged on the first rack;

a second scissor set, wherein the second scissor set comprises two second scissor arms intersected, and the second scissor arms are each provided with a second through hole at the intersection; one end of each second scissor arm is rotatably connected to the other end of each first scissor arm, respectively, the fixing member further comprises a first bolt passing through the second through hole, so that the second scissor arms can swing around the first bolt to extend the range.

4. The trash bag closing mechanism according to claim 3, wherein the scissor hinge further comprises:

a third scissor set, wherein the third scissor set comprises two third scissor arms intersected and a second bolt, and the third scissor arms are each provided with a third through hole at the intersection, one end of each third scissor arm is rotatably connected to the other end of each second scissor arm, respectively, and the second bolt passes through the third through hole;

a fourth scissor set, wherein the fourth scissor set comprises two fourth scissor arms intersected and a third bolt, and the fourth scissor arms are each provided with a fourth elongated through hole at the intersection, one end of each fourth scissor arm is rotatably connected to the other end of each third scissor arm, respectively, and the third bolt passes through the fourth elongated through hole.

5. The trash bag closing mechanism according to claim 1, wherein both the first guide plate and the second guide plate have a double-layer structure, the first guide plate comprises an upper clamping sheet and a lower clamping sheet, the second guide plate is provided with an upper clamping sheet guide groove and a lower clamping sheet guide groove which are respectively adapted to the upper clamping sheet and the lower clamping sheet, the upper clamping sheet is slidably connected to the upper clamping sheet guide groove to realize the closing of the upper part of the trash bag, and the lower clamping sheet can be slidably connected to the lower clamping sheet guide groove to realize the closing of the lower part of the trash bag.

6. The trash bag closing mechanism according to claim 5, wherein two sides of each of the first guide plate and the second guide plate are provided with positioning holes, a guide shaft received in the positioning holes, a first spring set arranged at the end of the guide shaft close to the first guide plate, and a second spring set arranged at the end of the guide shaft close to the second guide plate, in the initial state, the scissor-hinge unit and the power unit are in a stress state, the first guide plate compresses the first spring set, when the power unit drives the scissor-hinge unit to extend out, the first guide plate, under the elastic force of the first spring set, tightly pushes the second guide plate to eliminate the movement caused by the gap between the scissor-hinge unit, so that the scissor-hinge unit remains in a stable state during operation, when the first guide plate contacts the second guide plate, the second guide plate compresses the second spring set to resist the force of the heat sealing assembly, after the heat sealing is completed, the power unit drives the scissor-hinge unit to retract, and the second spring set tightly pushes the second guide plate to assist in discharge.

* * * * *